June 24, 1952 — W. D. FLORY — 2,601,380
GRAPE HOE
Filed Nov. 20, 1950 — 3 Sheets-Sheet 1

Willis D. Flory
INVENTOR.

BY *Clarence A. O'Brien and Harvey B. Jacobson*
Attorneys

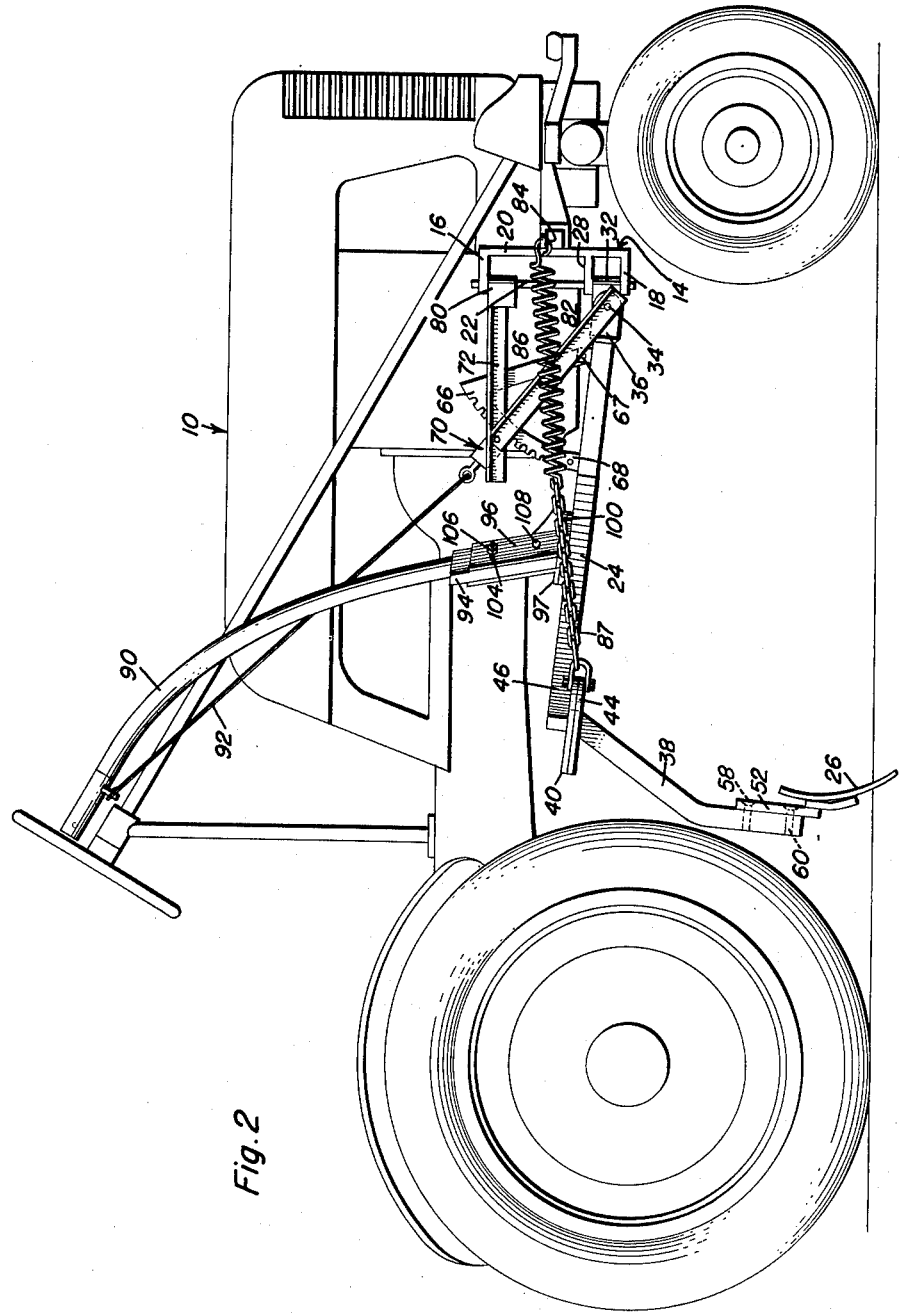

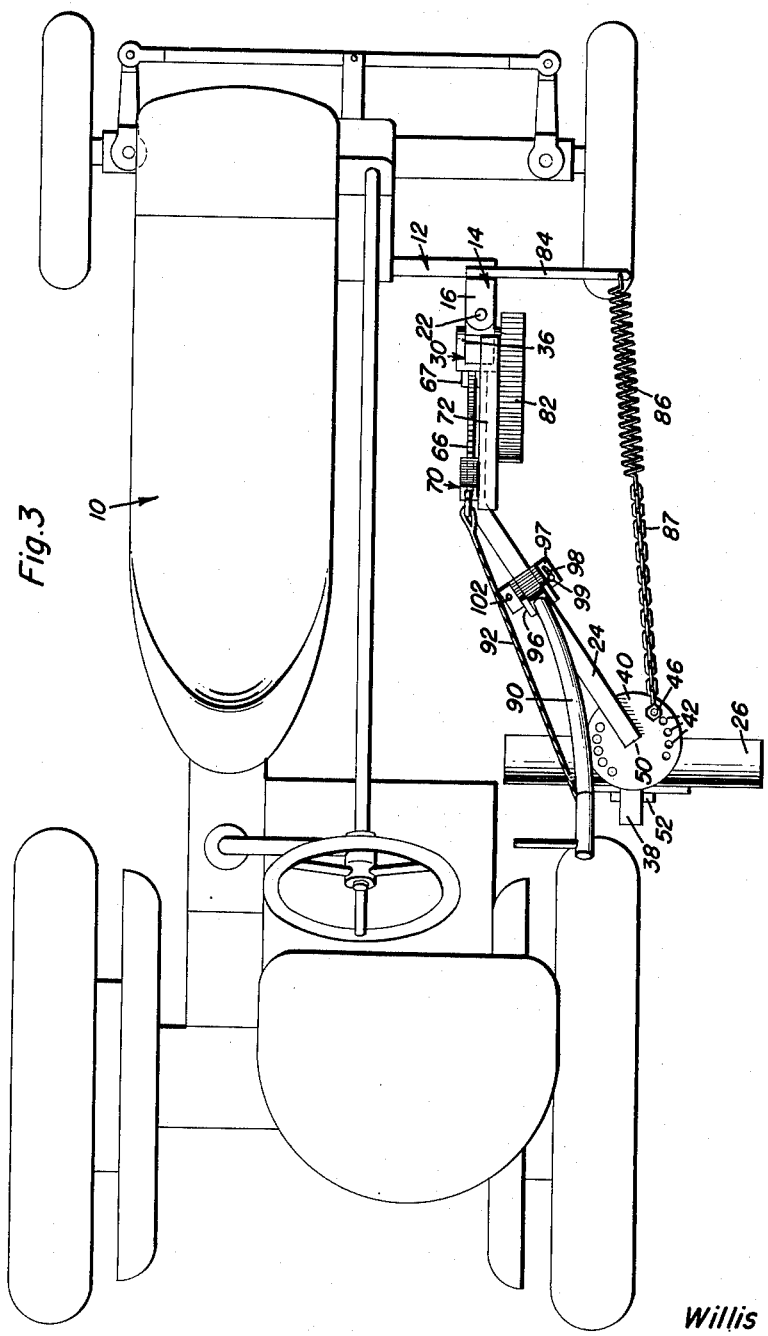

Patented June 24, 1952

2,601,380

UNITED STATES PATENT OFFICE 2,601,380

GRAPE HOE

Willis D. Flory, Decatur, Mich.

Application November 20, 1950, Serial No. 196,597

3 Claims. (Cl. 97—137)

This invention relates to improvements in farm implements.

An object of this invention is to provide an improved attachment for a standard tractor which is adapted to be used in cultivating between rows of grape vines, bushes of one type or another and other crops, said attachment being easily secured to the standard implement support of a tractor and arranged to be operated solely by one hand of the driver of the vehicle, said attachment also being so constructed that the plowbeam thereof is capable of being lifted in a vertical plane for adjustment and locked in that adjusted position and also capable of being pivoted in a horizontal plane about a vertical spindle as an axis so that the operator of the tractor may guide the earth working tool at the end of the plowbeam as the tractor moves through the field.

Ancillary objects and features of importance will become apparent in following the description of the illustrated form of the invention.

In the drawings:

Figure 2 is an elevation view of the device in Figure 1;

Figure 3 is a plan view of the device in Figure 1; and

Figures 1, 4:
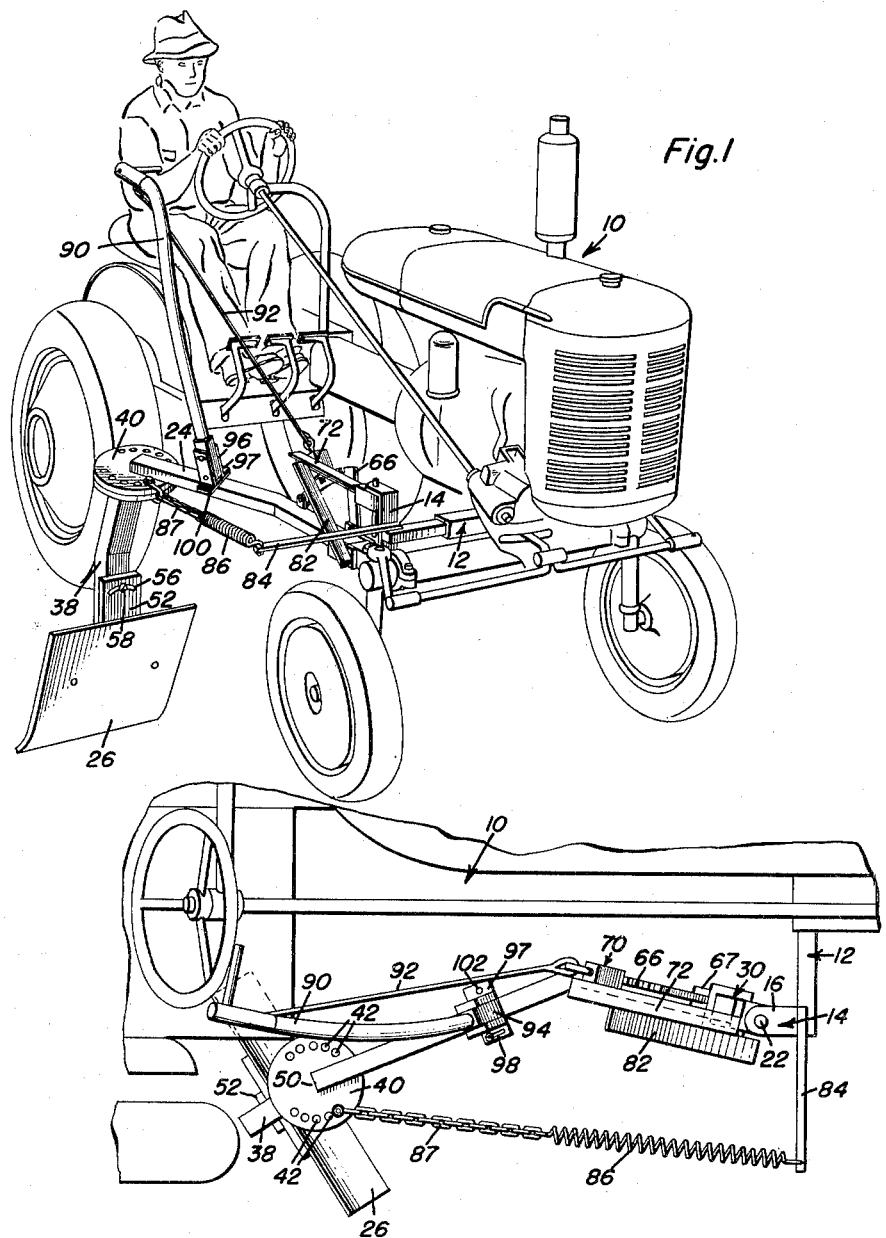
Figure 1 is a perspective view of a standard type of tractor having the attachment secured thereto.
Figure 4 is a fragmentary top view of the attachment showing how it is applied to a tractor.

In cultivating crops which are spaced quite far apart an attachment which is readily manipulated and adjusted while the tractor is being drawn through the field, is of good service to a farmer, vineyardist or other individual taking care of crops of one type or another. Accordingly, the instant attachment has been designed specifically for use in connection with a small standard tractor, one make of which is illustrated in the drawings and is indicated generally at 10. An implement support 12 forms a part of the standard equipment of the tractor 10. The attachment consists of a substantially U-shaped bracket 14 having an upper leg 16 and a lower leg 18 connected by the web 20. A vertically disposed spindle 22 is carried by the legs of the bracket 14 and is arranged to hold the inner end of a plowbeam 24, this plowbeam being arranged to support any suitable type of earth-working tool, for example, the hoe or scraper 26.

There is a plate 28 welded to the web of the bracket 14 and spaced from the leg 18. A universal joint 30 is located between the plate 28 and the leg 18, this universal joint including an element 32 which has a passage therein through which a part of the spindle 22 passes and a pivot pin 34 with its longitudinal axis perpendicular to the longitudinal axis of the spindle 22. This pivot pin not only passes through a hole in the element 32 but also through apertures in the bifurcated member 36, the bifurcations of which are located on opposite sides of the element 32. This bifurcated member is fixed to the inner end of the plowbeam 24 and hence, the universal joint 30 mounts the plowbeam 24 for universal movement. The opposite end of the plowbeam has the earth-working tool supporting arm 38 connected to it and therefore, when the plowbeam 24 is shifted either in a vertical plane or in a horizontal plane the arm 38 is moved with it thereby moving the earth-working tool 26.

The means of connecting the arm 38 with the adjacent part of the plowbeam 24 is preferably adjustable. There is an upper plate 40 provided with a number of apertures 42. The lower plate 44 which contacts the upper plate 40 is also provided with apertures. The locking pin, as the bolt 46, is adapted to pass through a pair of apertures, one in each plate, in order to hold the plates fixed together in a selected position. To adjust the earth-working tool 26 it is necessary only to remove the bolt 46, rotate the lower plate 44 with respect to the upper plate 40 about the pivot pin 50 as an axis and then replace the bolt 46.

In order to shift the earth-working tool 26 for another adjustment, the mounting plate 52, which is connected to the tool 26, is provided with a curved slot 56 through which the locking bolt 58 passes. This locking bolt is threaded in an opening in the lower end of the arm 38 allowing it to be tightened against the plate 52. When this adjustment takes place, the plate 52 rotates about the bolt 60 as an axis, this bolt being secured to the arm 38 and passed through an opening in the mounting plate 52.

Means are provided for retaining the plowbeam in a selected position of adjustment in a vertical plane. Inasmuch as the plowbeam 24 may be raised due to the presence of the universal joint 30, its weight will tend to retain the earth-working tool 26 pressed into the ground. It is sometimes desired to dig only a small amount and at that time the quadrant 66 which is secured by means of the brackets 67 and 68 to the beam 24, is used. A spring loaded dog assembly 70 is fixed to the horizontal arm 72 and the dog thereof is adapted to engage the teeth of the quadrant 66. Since the quadrant moves upwardly and downwardly with the beam 24 and the dog assembly 70 does not, the quadrant may be locked, thereby locking the beam 24 against vertical movement.

When the plowbeam 24 is locked so that it cannot move upwardly or downwardly, it is still capable of being shifted in a horizontal plane. For that reason the arm 72 has a bearing 80 at one end through which the spindle 22 passes. A support brace 82 is fixed at one end to the arm 72 and at the other end to the member 36.

A rod 84 is fixed to the bracket 14 and has one end of a spring 86 secured thereto. This spring is hooked at its opposite end to an adjustment chain 87 which is fastened to the bolt 46 thereby yieldingly opposing the movement of the beam 26 in one direction in a horizontal plane.

In order that the device be successful, it must be capable of being operated conveniently by the tractor driver. Hence, a handle 90 is arranged so that its end is located near the driver's seat of the tractor. This handle is provided with a rod or cable 92 which is arranged to actuate the dog assembly 70. The lower end of the handle 90 has a flat sided sleeve 94 fixed to it and located between the bracket 96. The lower end of the bracket is provided with a plate 97 in which there is an arcuate slot 98. A bolt 99 is passed through the arcuate slot and also through a similar slot in a lower mounting plate 100, which is fixed by standard means to the plowbeam 24. The opposite ends of the plates 100 and 97 are connected together by means of a pivot pin 102. Therefore, the handle 90 may be rotated for adjustment.

The bracket 96 is provided with side plates, each of which has an arcuate slot 104 therein through which the bolt 106 passes. This bolt also passes through a hole in the flat sided sleeve 94 so that the entire handle may be adjusted forwardly or rearwardly by pivoting about the pivot pin 108, passes through holes in the sides of the bracket 96 and in the flat sided sleeve 94.

In operation, after the described adjustments and attachments are made, the tractor is moved through a field and the operator of the tractor need only raise or lower the handle 90 or shift the handle laterally in order to cultivate as close as he desires to the various vines or plants.

When the blade 26 is used as shown in Figure 1 the soil is scraped to one side. However, when the scraper blade 26 is used as shown in Figure 2, the soil is pushed upwardly.

Having thus described the invention, what is claimed as new is:

1. An attachment for a tractor, said attachment comprising a bracket with a vertical spindle, an earth-working tool beam having a universal joint at one end connecting said beam to said spindle, a spring operatively connected with said beam to oppose movement of said beam in one direction in a horizontal plane, an arm mounted for pivotal movement in a horizontal plane and disposed on said spindle, a quadrant having teeth and secured to said beam, a locking device engaged with the teeth of said quadrant, said locking device being fixed to said arm whereby said locking device holds said beam against movement in said vertical plane, and a handle to move said beam connected to said beam.

2. An attachment for a tractor, said attachment comprising a bracket with a vertical spindle, an earth-working tool beam having a universal joint at one end connecting said beam to said spindle, a spring operatively connected with said beam to oppose movement of said beam in one direction in a horizontal plane, an arm mounted for pivotal movement in a horizontal plane and disposed on said spindle, a quadrant having teeth and secured to said beam, a locking device engaged with the teeth of said quadrant, said locking device being fixed to said arm whereby said locking device holds said beam against movement in said vertical plane, and a handle to move said beam connected to said beam by an adjustment assembly so that said handle may be shifted with respect to said beam.

3. The combination of claim 2 and means connected with said locking device for actuating said device, and said last mentioned means being carried by said handle.

WILLIS D. FLORY.

REFERENCES CITED

The following references are of record in the file of this patent:

UNITED STATES PATENTS

| Number | Name | Date |
|---|---|---|
| 859,175 | Glowacki | July 2, 1907 |
| 1,143,248 | Beall | June 15, 1915 |
| 2,295,329 | Black | Sept. 8, 1942 |
| 2,370,901 | Woodworth | Mar. 6, 1945 |
| 2,463,684 | Fiorella | Mar. 8, 1949 |
| 2,539,864 | Rutherford | Jan. 30, 1951 |